United States Patent
Park et al.

(10) Patent No.: US 12,506,139 B2
(45) Date of Patent: Dec. 23, 2025

(54) LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

(71) Applicant: SK On Co., Ltd., Seoul (KR)

(72) Inventors: Eunjun Park, Daejeon (KR); Joon-Sup Kim, Daejeon (KR); Gwi Ok Park, Daejeon (KR); Jeongbae Yoon, Daejeon (KR); Suk Chin Lee, Daejeon (KR); Hansu Kim, Seoul (KR); Donghan Youn, Namyangju-si (KR); Dong Jae Chung, Seoul (KR)

(73) Assignee: SK On Co., Ltd., Seoul (KR)

( * ) Notice: Subject to any disclaimer, the term of this patent is extended or adjusted under 35 U.S.C. 154(b) by 288 days.

(21) Appl. No.: 17/383,582

(22) Filed: Jul. 23, 2021

(65) Prior Publication Data
US 2022/0037644 A1 Feb. 3, 2022

(30) Foreign Application Priority Data
Jul. 29, 2020 (KR) ........................ 10-2020-0094407

(51) Int. Cl.
*H01M 4/36* (2006.01)
*H01M 4/02* (2006.01)
*H01M 4/48* (2010.01)

(52) U.S. Cl.
CPC .......... *H01M 4/364* (2013.01); *H01M 4/483* (2013.01); *H01M 2004/027* (2013.01)

(58) Field of Classification Search
CPC . H01M 4/364; H01M 4/483; H01M 2004/027
See application file for complete search history.

(56) References Cited

U.S. PATENT DOCUMENTS

| 10,497,934 B2 | 12/2019 | Park et al. |
| 10,950,852 B2 | 3/2021 | Hayashida et al. |

(Continued)

FOREIGN PATENT DOCUMENTS

| CN | 108598413 A | 9/2018 | |
| CN | 111584848 | * 8/2020 | ............ H01M 4/386 |

(Continued)

OTHER PUBLICATIONS

Richet ("Melting and premelting of silicates: Raman spectroscopy and X-ray diffraction of Li2SiO3 and Na2SiO3"—Phys Chem Minerals, 1995) (Year: 1995).*

(Continued)

*Primary Examiner* — Matthew T Martin
*Assistant Examiner* — Ankith R Sripathi
(74) *Attorney, Agent, or Firm* — The Webb Law Firm (57) ABSTRACT

Provided are a negative electrode active material which includes negative electrode active material particles which includes a silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide. A signal generated in a region of 200 to 600 $cm^{-1}$ according to a Raman spectrum is subjected to deconvolution into three peaks, which are set to peak A, peak B, and peak C from lowest to highest of an absolute value of a wavenumber. Also disclosed are a method of preparing the same, and a negative electrode and a lithium secondary battery including the negative electrode active material.

10 Claims, 2 Drawing Sheets

(56) References Cited

U.S. PATENT DOCUMENTS

| | | |
|---|---|---|
| 2014/0322606 A1 | 10/2014 | Lee et al. |
| 2018/0190982 A1 | 7/2018 | Fujino et al. |
| 2019/0157663 A1 | 5/2019 | Hirose et al. |
| 2019/0305305 A1 | 10/2019 | Ohsawa et al. |
| 2021/0313562 A1* | 10/2021 | Goodman ............. H01M 4/133 |
| 2022/0376228 A1* | 11/2022 | Qu ....................... H01M 4/386 |

FOREIGN PATENT DOCUMENTS

| | | | |
|---|---|---|---|
| CN | 111584848 A * | 8/2020 | ............ H01M 4/386 |
| JP | 2013161705 A | 8/2013 | |
| JP | 2014220216 A | 11/2014 | |
| JP | 2019175654 A | 10/2019 | |
| JP | 202087799 A | 6/2020 | |
| KR | 1020140070482 A | 6/2014 | |
| KR | 1020170048184 A | 5/2017 | |
| KR | 1020190116011 A | 10/2019 | |
| WO | 2017002933 A1 | 1/2017 | |
| WO | 2017208625 A1 | 12/2017 | |
| WO | 2018179970 A1 | 10/2018 | |

OTHER PUBLICATIONS

Richet("Meltingandpremeltingofsilicates:RamanspectroscopyandX-raydiffractionofLi2SiIO3andNa2SiO3"—PhysChem Minerals, 1995) (Year: 1995).*

Richet(Meltingandpremeltingofsilicates: RamanspectroscopyandxX-raydiffractionofLi2SiIO3andNa2Si03'—PhysChem Minerals 19095) (Year: 1995).*

Takahashi et al., "Raman spectra of rapidly quenched $Li_4SiO_4$—$Li_2WO_4$ glasses" Journal of Non-Crystalline Solids, 1989, pp. 330-333, vol. 107.

Veiko et al., "3D express crystallization of Foturan glass at $CO_2$ laser annealing on defects produced by picosecond laser", Proceedings of SPIE, 2013, pp. 184-190, vol. 9065.

* cited by examiner

LITHIUM-DOPED SILICON-BASED OXIDE NEGATIVE ELECTRODE ACTIVE MATERIAL, METHOD OF PREPARING THE SAME, AND NEGATIVE ELECTRODE AND SECONDARY BATTERY INCLUDING THE SAME

CROSS-REFERENCE TO RELATED APPLICATION

This application claims priority to Korean Patent Application No. 10-2020-0094407 filed Jul. 29, 2020, the disclosure of which is hereby incorporated by reference in its entirety.

BACKGROUND OF THE INVENTION

Field of the Invention

The following disclosure relates to a lithium-doped silicon-based oxide negative electrode active material, a method of preparing the same, and a negative electrode and a lithium secondary battery including the same.

Description of Related Art

As an issue of global warming which is a problem in modern society arises, a demand for environmentally friendly technologies is rapidly increasing in response thereto. In particular, as a technical demand for electric vehicles and energy storage systems (ESS) increases, a demand for a lithium secondary battery in the spotlight as an energy storage device is exploding. Therefore, studies to improve energy density of the lithium secondary battery are in progress.

However, conventional commercialized secondary batteries commonly use a graphite active material such as natural graphite and artificial graphite, but has a low energy density due to the low theoretical capacity of the graphite, and thus, studies to improve the energy density by developing a new negative electrode material are in progress.

As a solution thereto, a Si-based material having a high theoretical capacity (3580 mAh/g) is emerging as one solution. However, the Si-based material as such has a disadvantage of a deteriorated battery life characteristic due to large volume expansion (~400%) in the course of repeated charge and discharge. Thus, as a method of solving the issue of large volume expansion of the Si material, a $SiO_x$ material which has a low volume expansion rate as compared with Si has been developed. Though $SiO_x$ material shows an excellent life characteristic due to the low volume expansion rate, it is difficult to apply the $SiO_x$ material to a lithium secondary battery in practice due to the unique low initial coulombic efficiency (ICE) by initial formation of an irreversible phase.

SUMMARY OF THE INVENTION

An embodiment of the present invention is directed to improving a problem of deterioration of battery stability, a life characteristic, and the like due to expansion of silicon-based oxide particles caused by use of the silicon-based oxide as a negative electrode active material, by controlling crystallinity of the silicon-based oxide.

Another embodiment of the present invention is directed to improving a problem of deterioration of initial efficiency by formation of an irreversible phase during initial charging and discharging of a battery of the silicon-based oxide, by introducing a Li pretreatment process.

Another embodiment of the present invention is directed to improving a problem requiring more optimization by initial efficiency improvement of a silicon-based compound by Li pretreatment, specifically, such as, (1) energy costs during Li pretreatment and (2) a problem of optimizing a capacity characteristic by adjusting a ratio between a specific reversible phase and a specific irreversible phase in a lithium silicate formed by the Li pretreatment, by performing the Li pretreatment under specific conditions.

Still another embodiment of the present invention is directed to improving a problem of an increase in crystallinity of a silicon-based oxide corresponding to improvement of the initial efficiency problem of the silicon oxide by the Li pretreatment, by preparing a raw material of a silicon oxide under specific conditions and performing the Li pretreatment process under specific conditions.

In one general aspect, a negative electrode active material includes: negative electrode active material particles including: a silicon oxide ($SiO_x$, $0<x\leq 2$); and at least one lithium silicate selected from $Li_2SiO_3$, $Li_2Si_2O_5$, and $Li_4SiO_4$ in at least a part of the silicon oxide, wherein when a signal generated in a region of 200 to 600 $cm^{-1}$ according to a Raman spectrum is subjected to deconvolution into three peaks, which are set to peak A, peak B, and peak C from lowest to highest of an absolute value of a wavenumber, the negative electrode active material particles satisfy the following Relation 1:

$$0.3 \leq D\ (=C'/B'-C''/B'') \leq 1.0 \qquad \text{[Relation 1]}$$

wherein D is a difference value of a peak area ratio (C''/B'') from a peak intensity ratio (C'/B'), the peak intensity ratio (C'/B') is a ratio of an intensity of the peak C to an intensity of the peak B, and the peak area ratio (C''/B'') is a ratio of an area of the peak C to an area of the peak B.

The negative electrode active material particles may further satisfy the following Relation 2:

$$2.0 \leq \text{peak intensity ratio}(C'/B') \leq 3.0 \qquad \text{[Relation 2]}$$

wherein the peak intensity ratio (C'/B') is a ratio of the intensity of the peak C to the intensity of the peak B.

The negative electrode active material particles may further satisfy the following Relation 3:

$$1.0 \leq \text{peak area ratio}(C''/B'') \leq 3.0 \qquad \text{[Relation 3]}$$

wherein the peak area ratio (C''/B'') is a ratio of the area of the peak C to the area of the peak B.

The negative electrode active material particles may include 10 to 100 wt % of the lithium silicate with respect to a total weight.

The negative electrode active material particles may have a peak area ratio H/I according to an X-ray diffraction analysis method of less than 5.54 (H is an area of a $Li_2Si_2O_5$ peak positioned at 24.9±0.3°, and I is an area of a $Li_2SiO_3$ peak positioned at 26.9±0.3° in X-ray diffraction analysis).

The negative electrode active material particles may have a peak area ratio G/H according to X-ray diffraction analysis of less than 45.99 (G is an area of a Si peak positioned at 28.4±0.3°, and H is an area of a $Li_2Si_2O_5$ peak positioned at 24.9±0.3° in the X-ray diffraction analysis).

The negative electrode active material particles may have a peak area ratio G/I according to X-ray diffraction analysis of less than 8.75 (G is an area of a Si peak positioned at 28.4±0.3°, and I is an area of a $Li_2SiO_3$ peak positioned at 26.9±0.3° in the X-ray diffraction analysis).

The negative electrode active material particles may have a peak area ratio G/I according to the X-ray diffraction analysis of less than 1.1.

The negative electrode active material particles may include 25 wt % or less of $Li_4SiO_4$ with respect to the total weight.

The negative electrode active material may include 50 wt % or more of the negative electrode active material particles with respect to the total weight.

In another general aspect, a method of preparing a negative electrode active material includes: preparing silicon compound particles including a silicon compound; and mixing the silicon compound particles and a Li precursor and performing heat treatment to prepare negative electrode active material particles including: a silicon oxide ($SiO_x$, $0<x \leq 2$) and at least one lithium silicate selected from $Li_2SiO_3$, $Li_2Si_2O_5$, and $Li_4SiO_4$ in at least a part of the silicon oxide.

In another general aspect, a negative electrode includes: a negative electrode active material layer including the negative electrode active material and a water-based binder.

In still another general aspect, a lithium secondary battery includes: the negative electrode; a positive electrode; a separator positioned between the negative electrode and the positive electrode; and an electrolyte.

Other features and aspects will be apparent from the following detailed description, the drawings, and the claims.

DESCRIPTION OF THE INVENTION

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

An embodiment of the present invention provides a negative electrode active material. The negative electrode active material includes negative electrode active material particles including: a negative electrode active material particles including a silicon oxide ($SiO_x$, $0<x \leq 2$) and at least one lithium silicate selected from $Li_2SiO_3$, $Li_2Si_2O_5$, and $Li_4SiO_4$ in at least a part of the silicon oxide.

The negative electrode active material includes the negative electrode active material particles including the silicon oxide, thereby improving a battery capacity. In addition, the lithium silicate may suppress initial formation of an irreversible phase of the silicon oxide during initial charge and discharge.

When a signal generated in a region of 200 to 600 $cm^{-1}$ according to a Raman spectrum is subjected to deconvolution into three peaks, which are set to peak A, peak B, and peak C from lowest to highest of an absolute value of a wavenumber, the negative electrode active material particles are characterized by satisfying the following Relation 1:

$$0.3 \leq D \ (=C'/B'-C''/B'') \leq 1.0 \quad \text{[Relation 1]}$$

wherein D is a difference value of a peak area ratio (C''/B'') from a peak intensity ratio (C'/B'), the peak intensity ratio (C'/B') is a ratio of an intensity of the peak C to an intensity of the peak B, and the peak area ratio (C''/B'') is a ratio of an area of the peak C to an area of the peak B.

Peak A is a peak having a lowest wavenumber among the three peaks described above, and may appear wide in an amorphous region by a ternary phase including elements (for example, Li) other than a silicon element (Si) and an oxygen element (O) included in the material. Peak B may be a signal derived from a ternary phase and amorphous $SiO_x$ of an unreacted material. Peak C may be a signal derived from amorphous or crystalline substance of silicon (Si) particles included in the material. Specifically, when a resolution peak C is positioned at a region of 500 $cm^{-1} \pm 15$ $cm^{-1}$ or more, it is derived from crystalline Si, and when it is positioned at a region of 500 $cm^{-1} \pm 15$ $cm^{-1}$ or less, it may be derived from amorphous Si, amorphous $SiO_x$, or an amorphous Si of lithium silicate.

Meanwhile, when the peak C is positioned at a region of 500 $cm^{-1} \pm 15$ $cm^{-1}$ or more, only peak C among peaks A, B, and C has a crystalline phase characteristic, and thus, peak C shows a high intensity in a narrower region, and peaks A and B meaning a relatively amorphous phase are distributed in a low peak intensity in a wider region. Therefore, when peak C represents a crystalline phase, its shape tends to stand out more than those of peaks A and B. In general, a crystalline material has a sharp peak characteristic and an amorphous material has a broad peak characteristic in Raman spectrum analysis and the like. Due to the peak characteristics of the crystalline and amorphous substances as such, peak C of the crystalline material tends to have a larger change amount in a peak intensity than in a peak area. Therefore, it means that a difference of a peak area ratio (C''/B'') from a peak intensity ratio (C'/B') is increased and the growth of c-Si of the material is accelerated.

However, when the resolution peak C is positioned at a region of 500 $cm^{-1} \pm 15$ $cm^{-1}$ or less, peaks A, B, and C all have non-crystalline phase characteristics, and all peaks show peak characteristics of an amorphous phase showing a low peak intensity in a large region, and thus, the area and the intensity of the peak C changes at a similar level to other peaks. Therefore, a difference of a peak area ratio (C'/B') from a peak intensity ratio (C"/B") is decreased and the growth of c-Si of the material is suppressed to increase a content of a-Si. This may be regarded as an indicator for confirming improvement of a problem in which crystallization of $SiO_x$ particles proceeds during conventional Li pretreatment.

Preferably, the negative electrode active material particles may satisfy 0.3≤D≤1.0, preferably 0.4≤D≤0.8 in Relation 1. When D is less than the lower limit in Relation 1, it means that the Li pretreatment does not sufficiently proceed and battery performance such as initial efficiency and a life characteristic may be deteriorated. When D is more than the upper limit, it means that the growth of c-SI is accelerated, leading to deterioration of battery performance due to the crystallization of $SiO_x$ particles.

Meanwhile, the material being crystalline means that the shape of single Si positioned inside the particle is crystalline, and the material being amorphous means that the shape of single Si positioned inside the particle is amorphous or fine particles which are so small that it is difficult to measure the size by Scherrer's equation among XRD analysis methods, but which does not mean that the lithium silicate is amorphous or fine particles.

The negative electrode active material particles may further satisfy the following Relation 2:

2.0≤peak intensity ratio(C'/B')≤3.0      [Relation 2]

wherein the peak intensity ratio (C'/B') is a ratio of the intensity of the peak C to the intensity of the peak B.

The negative electrode active material particles may satisfy 2.0≤peak intensity ratio (C'/B')≤2.9, or 2.0≤peak intensity ratio (C'/B')≤2.8, more preferably 2.1≤peak intensity ratio (C'/B')≤2.7, or 2.1≤peak intensity ratio (C'/B')≤2.6, and most preferably 2.2≤peak intensity ratio (C'/B')≤2.3 in Relation 2. Thus, the effects described above may be further improved.

The negative electrode active material particles may further satisfy the following Relation 3:

1.0≤peak area ratio(C"/B")≤3.0      [Relation 3]

wherein the peak area ratio (C"/B") is a ratio of the area of the peak C to the area of the peak B.

The negative electrode active material particles may satisfy 1.0≤peak area ratio (C"/B")≤2.5, or 1.2≤peak area ratio (C"/B")≤2.2, more preferably 1.3≤peak area ratio (C"/B")≤2.0, or 1.3≤peak area ratio (C"/B")≤1.8, most preferably 1.3≤peak area ratio (C"/B")≤1.5, or 1.4≤peak area ratio (C"/B")≤1.5 in Relation 3. Thus, the effects described above may be further improved.

The negative electrode active material particles may include 10 to 100 wt % of the lithium silicate, and specifically include preferably 30 to 90 wt %, or 50 to 90 wt % of the lithium silicate, with respect to a total weight, in at least a part of the particles.

In addition, in order to achieve the above object, it is preferred that the negative electrode active material particles satisfy the relation of a peak area ratio H/I according to an X-ray diffraction analysis method of less than 5.54. Specifically, the peak area ratio H/I may be 4 or less or 3 or less, preferably 2.5 or less, 2.3 or less, or 2 or less, more preferably 1.5 or less, 1.0 or less, or 0.55 or less, and most preferably 0.4 or less, 0.3 or less, 0.1 or less, or 0.08 or less.

The lower limit of the peak area ratio H/I is not particularly limited, but may be 0.00 or more, or 0.01 or more.

H is an area of a $Li_2Si_2O_5$≤peak positioned at 24.9±0.3° and I is an area of a $Li_2SiO_3$≤peak positioned at 26.9±0.3° in the X-ray diffraction analysis. When the peak area ratio H/I is within the range, a smaller amount of Si is consumed in forming a phase of $Li_2SiO_3$ than in forming a phase of the lithium silicate such as $Li_2Si_2O_5$, whereby a capacity characteristic may be improved and a severe volume change of Si during cycles is mitigated so that it is advantageous for improvement of a life characteristic. Meanwhile, a $Li_4SiO_4$ phase has a high moisture content and high reactivity so that it is difficult to adjust the physical properties of slurry in the manufacture of an electrode, which is thus, not preferred.

Here, further, the negative electrode active material particles may have the peak area ratio G/H according to the X-ray diffraction analysis method of less than 45.99, specifically, 40 or less or 35 or less, preferably 30 or less, 25 or less, or or less, more preferably 15 or less, 12 or less, or 10 or less, and most preferably 9.5 or less, 9 or less, 8.5 or less, or 8.4 or less. The lower limit of the peak area ratio G/H is not particularly limited, but may be 0.00 or more, or 0.3 or more.

G is an area of an Si peak positioned at 28.4±0.3°, and H is an area of a $Li_2Si_2O_5$≤peak positioned at 24.9±0.3° in the X-ray diffraction analysis.

In addition, the negative electrode active material particles may further satisfy the relation of the peak area ratio G/I of less than 8.75, specifically less than 1.35 or 1.09 or less in the X-ray diffraction analysis method. The lower limit of the peak area ratio G/I is not particularly limited, but may be 0 or more, or 0.2 or more.

G is an area of a Si peak positioned at 28.4±0.3°, and I is an area of a $Li_2SiO_3$≤peak positioned at 26.9±0.3° in the X-ray diffraction analysis. When the peak area ratio G/I is within the range, $Li_2SiO_3$ may be increased while the growth of c-Si of the negative electrode active material particles is suppressed, which is thus, preferred.

The negative electrode active material particles may include 25 wt % or less, preferably 10 wt % or less, more preferably 5 wt % or less, and more preferably less than 1 wt % of the $Li_4SiO_4$, with respect to the total weight. Since the $Li_4SiO_4$ phase has an irreversible property to a Li ion and is vulnerable to moisture, it is not preferred as an active material of a negative electrode using a water-based binder, and it is preferred to include no $Li_4SiO_4$ phase for preparing a stable slurry. It is preferred that the content of $Li_4SiO_4$ is within the above range in terms of improvement of water resistance of a negative electrode slurry.

The negative electrode active material particles may be included at 50 wt % or more, preferably 60 wt % or more or 70 wt % or more, more preferably 80 wt % or more or 90 wt % or more, and as an example, 100 wt % with respect to the total weight of the negative electrode active material. Conventionally, when only silicon oxide particles were used as the negative electrode active material, an excellent life characteristic was not able to be implemented due to electrode volume expansion, and thus, a graphite-based active material or the like which may mitigate contraction/expansion of the silicon oxide-based particles was mixed therein in an amount of more than half and used. Since the Li pretreatment of the silicon oxide particles may suppress production of crystalline c-Si and increase a ratio of a-Si, the present invention may provide the negative electrode active material by including negative electrode active material particles including the silicon oxide and $Li_2SiO_3$ at a high content. Thus, initial efficiency and a life characteristic may be improved as compared with the conventional technology and, simultaneously, a discharge capacity may be further improved.

The negative electrode active material particles may have an average particle size of less than 30 μm and more than 2 μm, preferably less than 10 μm and more than 7 μm, and within the range, volume expansion of the negative electrode active material particles during intercalation/deintercalation of a Li ion may be decreased to suppress electrode deterioration.

The average particle size of the negative electrode active material particles may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample for the prepared negative electrode active material particles according to a KS A ISO 13320-1 standard and using Mastersizer 3000 from Malvern Panalytical Ltd.

Specifically, after particles are dispersed in ethanol as a solvent, if necessary, using an ultrasonic disperser, a volume density may be measured.

Another embodiment of the present invention provides a method of preparing the negative electrode active material. When a signal generated in a region of 200 to 600 cm$^{-1}$ according to a Raman spectrum is subjected to deconvolution into three peaks, which are set to peak A, peak B, and peak C from lowest to highest of an absolute value of a wavenumber, the negative electrode active material is characterized by satisfying the following Relation 1. The method of preparing a negative electrode active material includes: mixing the silicon compound particles and a Li precursor and performing heat treatment to prepare negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide.

First, in preparing the silicon compound particles, raw material powder is mixed and heat treatment is performed to prepare the silicon compound particles. Mixing the raw material powder may be mixing by appropriately adjusting a mixing ratio of Si powder and $SiO_2$ powder so that a mole ratio of Si and O of the prepared silicon compound particles ($SiO_x$, $0<x\leq2$) is formed, but the present invention is not limited thereto.

Subsequently, the mixed raw material powder may be placed in a furnace under an inert atmosphere, and subjected to heat treatment at a temperature of lower than 900° C., preferably lower than 800° C., or 500 to 700° C., and more preferably 500 to 650° C. for 1 to 12 hours or 1 to 8 hours under reduced pressure. Conventionally, in order to prepare the silicon compound particles, the heat treatment was performed at a high temperature of 900 to 1600° C., but in the case of a $SiO_x$ material or a SiO material, a c-Si seed grows at a heat treatment temperature of 800° C. or higher and a crystallite grows clearly at about 900° C., and thus, in the present invention, formation of the c-Si seed and the growth of c-Si is suppressed to prepare an amorphous or microcrystalline silicon-based compound.

The prepared silicon compound may be extracted, pulverized, and powdered to prepare the silicon compound particles.

In addition, a carbon layer may be further formed on a surface of the prepared silicon compound particles, and in this case, hydrocarbon gas is introduced into the furnace and heating may be performed at a temperature lower than a heat treatment temperature in the preparation of the silicon compound. Specifically, the heat treatment may be performed at a temperature of lower than 800° C. or a temperature of 500 to 700° C., more preferably a temperature of 500 to 650° C. for 1 to 12 hours or 1 to 8 hours, under reduced pressure or inert gas. Conventionally, the heat treatment was performed at a relatively higher temperature of 800 to 1200° C. or 800 to 950° C. for coating a carbon material of the surface of the silicon compound particles, but in this case, a disproportionation reaction of the silicon compound is accelerated due to the additional heat treatment to divide the region into Si and $SiO_x$ ($0<x<2$) or $SiO_2$ region, and it is analyzed that in the silicon compound material, the growth of c-Si is promoted at a temperature of 800° C. or higher and a size of the Si crystallite is increased. The present invention is characterized in that the size of the Si crystallite is immeasurable, so that the growth of c-Si is extremely suppressed. When the amorphous or microcrystalline silicon-based compound of the present invention is used, even in the case of performing the Li pretreatment under the same conditions, the growth of c-Si may be suppressed at a very high level, as compared with the silicon-based compound of a grown crystallite in the conventional art.

It is preferred to use a hydrocarbon gas having 3 or fewer carbon atoms as the hydrocarbon gas, since production costs are reduced and a good coating layer may be formed, but the present invention is not limited thereto.

Subsequently, the Li pretreatment process is performed. It is characterized in that the prepared silicon compound particles and the Li precursor are mixed and subjected to heat treatment to prepare negative electrode active material particles including a silicon oxide ($SiO_x$, $0<x\leq2$) and at least one lithium silicate selected from $Li_2SiO_3$, $Li_2Si_2O_5$, and $Li_4SiO_4$ in at least a part of the silicon oxide.

Specifically, it is preferred that the mixing of the silicon compound particles and the Li precursor is performed so that a Li/Si mole ratio is more than 0.3 and 1.0 or less, specifically more than 0.3 and 0.8 or less, preferably 0.4 to 0.8, more preferably 0.5 to 0.8, and most preferably 0.6 to 0.8. Within the mixing range, an optimal ratio of $Li_2SiO_3$ and $Li_2Si_2O_5$ may be found, and formation of c-Si and $Li_4SiO_4$ may be suppressed to greatly improve electrochemical performance of a battery.

As the Li precursor, at least one or more selected from LiOH, Li, LiH, $Li_2O$, and $Li_2CO_3$ may be used, and the compound is not particularly limited as long as it may be decomposed during the heat treatment.

Subsequently, the compound may be heat-treated at higher than 500° C. and lower than 700° C. for 1 to 12 hours under an inert atmosphere. When the heat treatment is performed at a temperature of 700° C. or higher, a disproportionation reaction occurs or the growth of a Si crystal is accelerated, so that the growth of c-Si is inevitable, and when a raw material is prepared at a temperature of lower than 700° C., crystal growth is suppressed to make it possible to prepare amorphous or microcrystalline silicon oxide particles. In addition, the heat treatment is performed at a low temperature of lower than 500° C., the effect of the lithium pretreatment is rapidly decreased, so that the effect of suppressing crystal phase growth of the silicon oxide particles by the heat treatment at a low temperature according to the present invention is not shown. Meanwhile, in the Li pretreatment by an electrochemical method or an oxidation-reduction method, $Li_4SiO_4$ is likely to be produced as the lithium silicate, but according to the present invention, a target lithium silicate having a different composition may be synthesized at a high purity by the heat treatment.

Meanwhile, for the inert atmosphere, a known method in which the inside of a reaction unit is purged with inert gas to create the inert atmosphere may be applied, and the inert gas may be selected from Ne, Ar, Kr, $N_2$, and the like, preferably may be Ar or $N_2$, but the present invention is not limited thereto.

Subsequently, the heat treatment product is recovered and pulverized to prepare the negative electrode active material including the final negative electrode active material particles, but the present invention is not limited thereto. Any known pulverization may be applied as the pulverization process, but the present invention is not limited thereto.

Another embodiment provides a negative electrode for a lithium secondary battery including: a current collector; and a negative electrode active material layer including the negative electrode active material and a water-based binder positioned on the current collector.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes the negative electrode active material and the water-based binder, and optionally, may further include a conductive material.

The negative electrode active material includes the negative electrode active material particles including: the silicon oxide ($SiO_x$, $0<x\leq2$); and at least one lithium silicate selected from $Li_2SiO_3$, $Li_2Si_2O_5$, and $Li_4SiO_4$ in at least a part of the silicon oxide, and optionally, may further include a material which may reversibly intercalate/deintercalate a lithium ion, a lithium metal, an alloy of a lithium metal, a material which may be doped or dedoped with lithium, or a transition metal oxide.

The negative electrode active material particles are as described above.

Examples of the material which may reversibly intercalate/deintercalate the lithium ion include a carbon material, that is, a carbon-based negative electrode active material which is commonly used in the lithium secondary battery. Representative examples of the carbon-based negative electrode active material include crystalline carbon, amorphous carbon, or a combination thereof. Examples of the crystalline carbon include graphite such as amorphous, plate-shaped, flake-shaped, spherical, or fibrous natural graphite or artificial graphite, and examples of the amorphous carbon include soft carbon or hard carbon, a mesophase pitch carbide, calcined coke, and the like.

The alloy of the lithium metal may be an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material which may be doped and dedoped with lithium may be a silicon-based material, for example, Si, $SiO_x$ ($0<x<2$), a Si-Q alloy (Q is an element selected from the group consisting of alkali metals, alkali earth metals, Group 13 elements, Group elements, Group 15 elements, Group 16 elements, transition metals, rare-earth elements, and combinations thereof, and is not Si), a Si-carbon composite, Sn, $SnO_2$, a Sn—R alloy (R is an element selected from the group consisting of alkali metals, alkali earth metals, Group 13 elements, Group 14 elements, Group 15 elements, Group 16 elements, transition metals, rare-earth elements, and combinations thereof, and is not Si), a Sn-carbon composite, and the like, and also, a mixture of at least one thereof and $SiO_2$ may be used. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

In the negative electrode active material, the negative electrode active material particles may be included at 50 wt % or more, preferably 60 wt % or more or 70 wt % or more, more preferably 80 wt % or more or 90 wt % or more, and as an example, 100 wt % or more with respect to the total weight of the negative electrode active material.

The water-based binder serves to adhere negative electrode active material particles to each other and to attach the negative electrode active material to the current collector well. The water-based binder may be polyvinylidene fluoride (PVDF), polyacrylic acid (PAA), polyvinyl alcohol (PVA), carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof, and the like, and specifically, the binder may include a binder formed of carboxymethyl cellulose (CMC), styrene-butadiene rubber (SBR), and a mixture thereof.

The conductive material is used for imparting conductivity to an electrode and any conductive material may be used as long as it is an electroconductive material without causing a chemical change in the battery to be configured. Examples of the conductive material include carbon-based materials such as natural graphite, artificial graphite, carbon black, acetylene black, ketjen black, and carbon fiber; metal-based materials such as metal powder or metal fiber of copper, nickel, aluminum, silver, and the like; conductive polymers such as a polyphenylene derivative; or a mixture thereof.

Each of the contents of the binder and the conductive material in the negative electrode active material layer may be 1 to 10 wt %, preferably 1 to 5 wt % with respect to the total weight of the negative electrode active material layer, but is not limited thereto.

Another embodiment provides a lithium secondary battery includes: the negative electrode; a positive electrode; a separator positioned between the negative electrode and the positive electrode; and an electrolyte.

The negative electrode is as described above.

The positive electrode includes a positive electrode active material layer formed by applying a positive electrode slurry including a positive electrode active material on the current collector.

The current collector may be a negative electrode current collector described above, and any known material in the art may be used, but the present invention is not limited thereto.

The positive electrode active material layer includes the positive electrode active material, and optionally, may further include a binder and a conductive material. The positive electrode active material may be any known positive electrode active material in the art, and for example, it is preferred to use a composite oxide of lithium with a metal selected from cobalt, manganese, nickel, and a combination thereof, but the present invention is not limited thereto.

The binder and the conductive material may be a binder and a negative electrode conductive material described above, and any known material in the art may be used, but the present invention is not limited thereto.

The separator may be selected from glass fiber, polyester, polyethylene, polypropylene, polytetrafluoroethylene, or a combination thereof, and may be in the form of nonwoven or woven fabric. For example, a polyolefin-based polymer separator such as polyethylene or polypropylene may be mainly used in the lithium secondary battery, a separator coated with a composition including a ceramic component or a polymer material for securing thermal resistance or mechanical strength, optionally, a single layer or a multi-layer structure may be used, and any known separator in the art may be used, but the present invention is not limited thereto.

The electrolyte includes an organic solvent and a lithium salt.

The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any known organic solvent in the art may be used, but the present invention is not limited thereto.

The lithium salt is dissolved in the organic solvent and acts as a source of the lithium ion in the battery to allow basic operation of the lithium secondary battery and is a material which promotes movement of lithium ions between a positive electrode and a negative electrode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte has appropriate conductivity and viscosity, so that the electrolyte may exhibit excellent electrolyte performance and lithium ions may effectively move.

In addition, the electrolyte may further include pyridine, triethylphosphate, triethanolamine, cyclic ether, ethylene diamine, n-glyme, hexaphosphate triamide, a nitrobenzene derivative, sulfur, a quinone imine dye, N-substituted oxa-zolidinone, N,N-substituted imidazolidine, ethylene glycol dialkyl ether, an ammonium salt, pyrrole, 2-methoxyethanol, aluminum trichloride, and the like, if necessary, for improving charge/discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sulfone (PRS), fluoro-propylene carbonate (FPC), and the like may be further included for improving conservation properties at a high temperature.

The method of producing a lithium secondary battery according to the present invention for achieving the above object may include laminating the produced negative electrode, separator, and positive electrode in this order to form an electrode assembly, placing the produced electrode assembly in a cylindrical battery case or an angled battery case, and then injecting an electrolyte. Otherwise, the lithium secondary battery may be produced by laminating the electrode assembly and immersing the assembly in the electrolyte to obtain a resultant product which is then placed in a battery case and sealed.

As the battery case used in the present invention, those commonly used in the art may be adopted, there is no limitation in appearance depending on the battery use, and for example, a cylindrical shape, an square-shape, a pouch shape, or a coin shape may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the preferred Examples and Comparative Examples of the present invention will be described. However, the following Examples are only a preferred exemplary embodiment of the present invention, and the present invention is not limited thereto.

EXAMPLES

Examples 1-1 to 1-7, and Comparative Examples 1-1 and 1-4

(Preparation of Silicon Compound Particles)

A raw material in which a silicon metal and silicon dioxide were mixed was introduced to a reaction furnace and evaporated in the atmosphere having a vacuum degree of 10 Pa to obtain a product, which was deposited on a suction plate and sufficiently cooled to take out a deposit, which was pulverized with a ball mill. In the thus-obtained silicon compound particles, x of $SiO_x$ was 1.0. Continuously, a particle diameter of the silicon compound particles was adjusted by classification. Thereafter, pyrolysis CVD was performed to coat a carbon material on a surface of the silicon compound particles. An average thickness of the carbon material was 100 nm. The prepared silicon compound was SiO particles having an average particle diameter (D50) of 8 μm. Here, (1) the temperature of the reaction furnace (heat treatment temperature) and the heat treatment time in preparation of the silicon compound particles, and (2) the temperature of the reaction furnace (heat treatment temperature) and the heat treatment time in coating of the carbon material on the surface of the silicon compound particles were performed as summarized in Example 1-1 of the following Table 4.

(Preparation of Negative Electrode Active Material)

The prepared silicon compound particles and LiOH powder were mixed to form mixed powder, the mixed powder and a zirconia ball (1-20 times the mixed powder) were placed in an airtight container, and shaking and mixing were performed for 30 minutes using a shaker. Thereafter, the mixed powder was filtered using a sieve of 25-250 μm and then placed in an aluminum crucible.

The aluminum crucible was heat-treated in a furnace under a nitrogen gas atmosphere for 1-12 hours. Subsequently, the heat-treated powder was recovered and pulverized in a mortar to prepare negative electrode active material particles including a silicon oxide ($SiO_x$) and a lithium silicate (such as $Li_2Si_2O_5$ and $Li_2SiO_3$). Here, the heat treatment temperature in preparation of the negative electrode active material particles and a Li/Si mole ratio in mixing the silicon compound and the LiOH powder are summarized in the following Table 1.

100 wt % of the prepared negative electrode active material particles were used with respect to the total weight of the negative electrode active material to prepare a negative electrode active material.

(Production of Negative Electrode)

The prepared negative electrode active material, a conductive material, carbon black (super P), and a water-based binder (polyacrylic acid) were dispersed at a weight ratio of 8:1:1 in an aqueous solution, applied on a Cu foil, and dried in vacuo at 80-160° C. for 1-24 hours to produce a negative electrode.

(Production of Half Battery)

The produced negative electrode and a lithium metal as a counter electrode were used, a PE separator was interposed between the negative electrode and the counter electrode, and an electrolyte was injected to assembly a coin cell (CR2032). The assembled coin cell was paused at room temperature for 3-24 hours to produce a half battery.

Here, the electrolyte was obtained by mixing a lithium salt 1.0 M $LiPF_6$ with an organic solvent (EC:EMC=3:7 vol %) and mixing an electrolyte additive FEC 2 vol %.

Evaluation Example

1. Analysis of Crystallinity of Negative Electrode Active Material Particles by Raman Spectrum Analysis For Raman spectrum analysis, an Invia confocal Raman microscope available from Renishaw (UK) was used, and the surface of the particles was measured 8 times in a range of 67-1800 $cm^{-1}$ in a static mode at a laser wavelength of 532 nm at a lens magnification of 50 times, and the average value thereof was applied.

The analysis results of the Raman spectrum were obtained from 200 $cm^{-1}$ to 600 $cm^{-1}$ for confirming the area ratio and the intensity ratio of each peak, in which when the resolution peaks obtained by subjecting each signal to deconvolution into three peaks with a Gaussian model under a condition of R-square of 0.987 or more were set to peak 1, peak 2, and peak 3 from lowest to highest of a wavenumber, the position of the peak herein was set to A, B, C, the intensity of the peak was set to A', B', and C', and the area of the peak was set to A", B", and C", and they are summarized in the following Tables 1 and 2.

2. Analysis of Lithium Silicate Composition Formed in Silicon Oxide Particles by X-Ray Diffraction Analysis Method For XRD analysis, an Empyrean XRD diffractometer available from PANalytical was used, and measurement was performed by applying a current of 40 mA with a voltage of 45 kV. Analysis of each phase was performed by comparison with JCPDS card No. 98-002-9287 (Si), 98-002-8192 ($Li_2SiO_3$), 98-028-0481 ($Li_2Si_2O_5$), 98-003-5169 ($Li_4SiO_4$). From the obtained results, peak positions of (111) of Si positioned at 28.4±0.3°, (111) of $Li_2Si_2O_5$ positioned at 24.9±0.3°, and (111) of $Li_2SiO_3$ positioned at 26.9±0.3° were confirmed. The thus-obtained peak was subjected to deconvolution to determine area G corresponding to (111) of Si, area H corresponding to (111) of $Li_2Si_2O_5$, and area I corresponding to (111) of $Li_2SiO_3$, respectively, and determine an area ratio. The evaluation results are shown in the following Table 3.

3. Analysis of Si Crystalline Size of Silicon Compound by X-Ray Diffraction Analysis Method For XRD analysis, an Empyrean XRD diffractometer available from PANalytical was used, and measurement was performed by applying a current of 40 mA with a voltage of 45 kV. Specifically, a half-band width of a diffraction peak caused by a Si (111) crystal face (2θ=28.4±0.3°) was obtained by X-ray diffraction using a Cu—Kα ray. The size of the Si crystalline was analyzed using a Scherrer's equation.

Scherrer Equation: $\tau = (K\lambda)/\beta \cos \theta$

K: dimensionless shape factor, 0.9

λ: X-ray wavelength, 0.1540598 nm

β: full width at half maximum

θ: Bragg angle

4. Evaluation of Electrochemical Properties (Initial Discharge Capacity, Initial Efficiency, and Life Characteristic)

The produced half battery was charged at a constant current at a current of 0.1 C rate at room temperature (25° C.) until a voltage reached 0.01 V (vs. Li), and then was charged at a constant voltage at a voltage of 0.01V until a current reached 0.01 C rate (cut-off current). The battery was discharged at a constant current of 0.1 C rate until the voltage reached 1.5 V (vs. Li). The charge and discharge were set as one cycle, one more cycle of charge and discharge was identically performed, and then 50 cycles in which the applied current was changed to 0.5 C during charge and discharge was performed, with a pause of 10 minutes between the cycles.

An initial discharge capacity, initial efficiency, and a life characteristic as a capacity retention rate (%) which is a discharge capacity for 50 cycles to a discharge capacity for one cycle were measured, and the results are summarized in the following Table 2.

TABLE 1

| | Li pretreatment conditions | | Raman spectrum analysis ($cm^{-1}$) | | |
|---|---|---|---|---|---|
| | Heat treatment temperature (° C.) | Li/Si mole ratio | Peak position (A) | Peak position (B) | Peak position (C) |
| Comparative Example 1-1 | 600 | 0.25 | 290.4 | 372.8 | 470.4 |
| Example 1-1 | 600 | 0.33 | 284.5 | 381.5 | 471.9 |
| Example 1-2 | 600 | 0.50 | 305.1 | 392.9 | 468.7 |
| Example 1-3 | 600 | 0.67 | 342.9 | 472.5 | 497.1 |
| Comparative Example 1-2 | 600 | 1.00 | 423.1 | 490.4 | 508.6 |
| Comparative Example 1-3 | 550 | 0.25 | 281.2 | 378.5 | 470.0 |
| Example 1-4 | 550 | 0.50 | 306.3 | 383.9 | 460.6 |
| Example 1-5 | 550 | 0.67 | 301.1 | 380.2 | 462.6 |
| Example 1-6 | 550 | 0.75 | 298.5 | 391.8 | 468.5 |
| Example 1-7 | 550 | 1.00 | 320.1 | 460.0 | 498 |
| Comparative Example 1-4 | 550 | 1.25 | 415.5 | 482.7 | 509.5 |
| Reference 1 | — | — | 314.2 | 395.1 | 472.2 |

TABLE 2

| | Raman spectrum analysis | | | Battery performance | | |
|---|---|---|---|---|---|---|
| | | | Intensity | | | |
| | Intensity ratio (C'/B') | Area ratio (C''/B'') | ratio-area ratio (D) (C'/B'-C''/B'') | Discharge capacity (mAh/g) | Initial efficiency (%) | Life characteristic (%) |
| Comparative Example 1-1 | 2.41 | 2.14 | 0.27 | 1451 | 79.2 | 28.2 |
| Example 1-1 | 2.01 | 1.22 | 0.79 | 1394 | 83.4 | 33.4 |
| Example 1-2 | 2.66 | 1.95 | 0.71 | 1300 | 84.7 | 40.3 |
| Example 1-3 | 1.13 | 0.37 | 0.76 | 1269 | 88.2 | 61.1 |
| Comparative Example 1-2 | 1.71 | 0.67 | 1.04 | 1127 | 89.2 | 15.0 |
| Comparative Example 1-3 | 2.91 | 2.72 | 0.19 | 1466 | 77.1 | 27.0 |
| Example 1-4 | 2.82 | 2.46 | 0.36 | 1358 | 81.7 | 35.0 |
| Example 1-5 | 2.56 | 2.13 | 0.43 | 1360 | 89.5 | 84.0 |
| Example 1-6 | 2.21 | 1.44 | 0.77 | 1350 | 89.4 | 95.2 |
| Example 1-7 | 2.43 | 1.51 | 0.92 | 1241 | 89.1 | 79.2 |
| Comparative Example 1-4 | 2.89 | 1.74 | 1.15 | 1190 | 89.2 | 68.5 |
| Reference 1 | 2.52 | 2.43 | 0.09 | 1613 | 74.2 | 9.0 |

Referring to Tables 1 and 2, a resolution peak corresponding to peak 1 (peak position A) is not regarded as only a peak corresponding to crystalline and amorphous Si, and it may be interpreted that the amorphous region peak appeared broad due to a ternary phase including an element (for example, Li) other than a silicon element (Si) and an oxygen element (O) included in the material. A resolution peak corresponding to peak 2 (peak position B) may be interpreted as a signal derived from amorphous $SiO_x$ of the ternary phase described above and an unreacted portion. A resolution peak corresponding to peak 3 (peak position C) is a determination factor for distinguishing amorphous and crystalline silicon particles (Si) of the material, and it was determined that when the resolution peak is positioned at a region of 500 cm$^{-1}$±15 cm$^{-1}$ or more, the peak is derived from crystalline Si, and when the resolution peak is positioned at a region of 500 cm$^{-1}$±15 cm$^{-1}$ or less, the peak is derived from amorphous Si and amorphous Si of lithium silicate.

In Examples 1-1, 1-2, and 1-4 to 1-6, since peak C was positioned at a region of 500 cm$^{-1}$+15 cm$^{-1}$ or less, it was confirmed that the growth of c-Si of the material was suppressed. In addition, though peak C of Examples 1-3 and 1-7 was positioned at a boundary of 500 cm$^{-1}$, a difference value of the peak area ratio (C'/B') to the peak intensity ratio (C''/B'') was within the range of the present invention, and thus, it is interpreted that the growth of crystalline c-Si of the material was suppressed and the content of the amorphous a-Si phase was high. However, in Comparative Example 1-2, the intensity ratio of the peak C relative to the area ratio of the peak C was high, the growth of c-Si was accelerated, and thus, the material was not preferred for the material of the present invention. Comparative Example 1-4 was the same.

Meanwhile, the negative electrode active material particles of Examples 1-1 to 1-7, which were prepared under the conditions of the present invention during the Li pretreatment, effectively formed a lithium silicate phase on a silicon oxide, and also, Raman spectrum analysis suggests that the growth of c-Si was suppressed to form a-Si at a high ratio. This result shows that the growth of c-Si is suppressed to increase the a-Si ratio, thereby improving the problem in which crystallization of $SiO_x$ particles proceeds during conventional Li pretreatment, as described above. Accordingly, the battery performance as compared with Comparative Examples 1-1 to 1-4 was improved.

In Comparative Examples 1-2 and 1-4, it was analyzed that the lithium precursor was mixed at an excessively high content during the Li pretreatment, so that the growth of c-Si was not sufficiently suppressed. In Example 1-7, it may be confirmed that though the same content of the lithium precursor as that in Comparative Example 1-2 was applied, the manufactured material stayed at an amorphous region. This means that the growth of the crystalline substance was suppressed due to a lower heat treatment temperature than that in Comparative Example 1-2. However, in Comparative Examples 1-1 and 1-3, a low content of the lithium precursor was mixed, and as a result, the Li pretreatment was not sufficiently performed and the initial efficiency and the life characteristic were deteriorated.

In addition, in Examples 1-2 and 1-4, or Examples 1-3 and 1-5, though the mixing ratios of the Li precursor were identical, it was analyzed that the crystallinity of Si was increased at about 600° C., and the life characteristic was not improved much. In particular, in Example 1-5, since the Li pretreatment was performed at a relatively low temperature, an amorphous or microcrystalline negative electrode active material was able to be obtained, and relatively improved capacity and efficiency were shown.

For Reference 1, the maximum peak (Peak position C) appeared at 472.2 cm$^{-1}$, which does not mean that the crystallinity degree of the material was high as compared with the materials of Examples 1-1, 1-2, and 1-4 to 1-6, and Comparative Example 1-1, but may be interpreted as being a typical signal of amorphous or microcrystalline $SiO_x$ including no lithium silicate. Therefore, when a lithium silicate is included by the Li pretreatment, it should be construed as being that the maximum peak (Peak position C) may shift to a lower wave number range as in the Examples of Table 1.

Thus, it was found that only when a ratio of the Li precursor in a specific range to the $SiO_x$ active material and temperature setting are involved, the negative electrode active material having suppressed formation of crystalline Si may be obtained.

TABLE 3

| | Li pretreatment conditions | | | | | | | |
|---|---|---|---|---|---|---|---|---|
| | Li/Si mole ratio | Heat treatment temperature (° C.) | $Si/Li_2SiO_3$ (G/I) | $Si/Li_2Si_2O_5$ (G/H) | $Li_2Si_2O_5/Li_2SiO_3$ (H/I) | Discharge capacity (mAh/g) | Initial efficiency (%) | Life characteristic (%) |
| Comparative Example 1-1 | 0.25 | 600 | 1.35 | 0.24 | 5.54 | 1451 | 79.2 | 28.2 |
| Example 1-1 | 0.33 | 600 | 1.09 | 0.48 | 2.26 | 1394 | 83.4 | 33.4 |
| Example 1-2 | 0.50 | 600 | 0.60 | 1.12 | 0.54 | 1300 | 84.7 | 40.3 |
| Example 1-3 | 0.67 | 600 | 0.76 | 4.69 | 0.16 | 1269 | 88.2 | 61.1 |
| Comparative Example 1-2 | 1.00 | 600 | 8.75 | 45.99 | 0.19 | 1127 | 89.2 | 15.0 |
| Example 1-4 | 0.50 | 550 | 0.22 | 0.67 | 0.33 | 1358 | 81.7 | 35.0 |
| Example 1-5 | 0.67 | 550 | 0.26 | 8.40 | 0.03 | 1360 | 89.5 | 84.0 |
| Example 1-6 | 0.75 | 550 | 0.34 | 7.51 | 0.05 | 1350 | 89.4 | 95.2 |
| Example 1-7 | 1.00 | 550 | 0.42 | 8.33 | 0.05 | 1241 | 89.1 | 79.2 |
| Reference 1 | — | — | — | — | — | 1613 | 74.2 | 9.0 |

Referring to Table 3, the negative electrode active material particles of Examples 1-1 to 1-7, which were prepared under the conditions of the present invention during the Li pretreatment, may suppress the growth of crystalline Si to form amorphous Si at a high ratio, and also, may promote the formation of $Li_2SiO_3$ in which more $Li^+$ ions are reacted based on the same number of moles of Si during initial irreversible phase formation, and thus, they are effective in terms of initial efficiency and the life characteristic.

Meanwhile, in Comparative Example 1-2, when the Li pretreatment was performed, a mixing amount of the lithium precursor was somewhat large and the heat treatment temperature was raised, $Li_2SiO_3$ was formed at a high rate but the growth of c-Si was promoted, so that the life characteristic was not good.

TABLE 4

| | Content of lithium silicate (wt %) | | Battery performance |
|---|---|---|---|
| | Total content | Content of Li4SiO4 (wt %) | 50 cycle life characteristic (%) |
| Comparative Example 1-1 | 64 | 0 | 28.2 |
| Example 1-1 | 79 | 0 | 33.4 |
| Example 1-2 | 87 | 0 | 40.3 |
| Example 1-3 | 82 | 0 | 61.1 |
| Comparative Example 1-2 | 35 | 35 | 15.0 |
| Example 1-4 | 84 | 0 | 35.0 |
| Example 1-5 | 81 | 0 | 84.0 |
| Example 1-6 | 57 | 0 | 95.2 |
| Example 1-7 | 42 | 24 | 79.2 |

(In Table 4, the content of the lithium silicate and the content of $Li_4SiO_4$ are in wt % with respect to the total weight of the negative electrode active material particles, respectively.)

Referring to Tables 1 and 4, it was confirmed that c-Si and $Li_4SiO_4$ phases were easily formed under the conditions of an excessive amount of the Li precursor during the Li pretreatment, and as described above, c-Si may deteriorate the life characteristic, and the $Li_4SiO_4$ phase has high reactivity with moisture, so that it is difficult to adjust the physical properties of a slurry in the electrode manufacture, which is thus not preferred.

In addition, as seen from Examples 1-4 to 1-7, even when the ratio of the Li precursor is excessive, formation of c-Si and the $Li_4SiO_4$ phase may be suppressed when the pretreatment temperature is lowered, but when a certain content is exceeded, the effect of suppressing c-Si and $Li_4SiO_4$ phase production may be reduced.

Examples 2-1, and Comparative Examples 2-1 to 2-6

Negative electrode active material particles were prepared in the same manner as in Example 1-1, except that the preparation of the silicon compound particles and coating the surface with a carbon layer were performed under the conditions described in Table 5. Here, (1) the heat treatment temperature and the heat treatment time in the preparation of the silicon compound particles and the crystallite size of the prepared silicon compound particles, (2) the heat treatment temperature and the heat treatment time when the surface of the silicon compound particles with a carbon material, and a crystallite size of the prepared product, and (3) the Raman spectrum analysis results of the Li-pretreated negative electrode active material particles are summarized in the following Table 5.

TABLE 5

| | SiOx base material | | | Coating of carbon material on SiOx base material surface | | | Lithium pretreatment progress Peak position (C) (cm$^{-1}$) |
|---|---|---|---|---|---|---|---|
| | Heat treatment temperature (° C.) | Heat treatment time (h) | Si crystallite size (nm) | Heat treatment temperature (° C.) | Heat treatment time (h) | Si crystallite size (nm) | |
| Example 1-1 | 600 | 1~12 | immeasurable | 600 | 1~3 | immeasurable | 471.9 |
| Example 2-1 | 600 | 1~12 | immeasurable | 600 | 4~6 | immeasurable | 474 |

TABLE 5-continued

| | SiOx base material | | | Coating of carbon material on SiOx base material surface | | | Lithium pretreatment progress Peak position (C) (cm$^{-1}$) |
|---|---|---|---|---|---|---|---|
| | Heat treatment temperature (° C.) | Heat treatment time (h) | Si crystallite size (nm) | Heat treatment temperature (° C.) | Heat treatment time (h) | Si crystallite size (nm) | |
| Comparative Example 2-1 | 900 | 1~4 | 8 | No coating progress | | 8 | 518 |
| Comparative Example 2-2 | 1200 | 1~3 | 21 | No coating progress | | 21 | 521 |
| Comparative Example 2-3 | 800 | 2~5 | 5.7 | 800 | 1~3 | 8 | 516 |
| Comparative Example 2-4 | 800 | 2~5 | 5.7 | 900 | 1~3 | 29 | 520 |
| Comparative Example 2-5 | 550 | 2~6 | immeasurable | 800 | 1~3 | 7.5 | 517 |
| Comparative Example 2-6 | 600 | 2~5 | immeasurable | 900 | 1~3 | 32 | 519 |

Referring to Table 5, in Examples 1-1 and 2-1, since the heat treatment conditions were adjusted during preparation of the SiO$_x$ base material and coating of the surface with a carbon material, the Si crystallite size was able to be effectively controlled. However, in Comparative Examples 2-1, 2-2, 2-3, 2-4, 2-5, and 2-6, it was found that the Si crystallite size was formed high. Thus, though the Li pretreatment heat treatment conditions were adjusted in the range of the present invention, it was confirmed that the formation of c-Si was not suppressed. The above results suggest that in order to suppress the growth of c-Si of the SiO$_x$ negative electrode active material particles, the Si crystallite size of a SiO$_x$ base material or carbon material-coated SiO$_x$ as a Li pretreatment raw material should be controlled to a very low level.

Examples 3-1 to 3-5, and Comparative Examples 3-1 to 3-5

Half batteries of Examples 3-1 to 3-5, and Comparative Examples 3-1 to 3-5 were produced in the same manner as in Example 1-4 and Comparative Example 1-1, respectively, except that the negative electrode active material having a configuration (weight ratio) of natural graphite:negative electrode active material particles (SiO$_x$ particles) of the following Table 6 was prepared.

TABLE 6

| | Natural graphite:SiO$_x$ particles (weight ratio) | Discharge capacity (mAh/g) | Initial efficiency (%) | Life characteristic (%) |
|---|---|---|---|---|
| Example 3-1 | 5:5 | 860 | 92.1 | 90.2 |
| Example 3-2 | 4:6 | 958 | 91.5 | 88.8 |
| Example 3-3 | 3:7 | 1063 | 91.1 | 87.4 |
| Example 3-4 | 2:8 | 1162 | 90.6 | 86.1 |
| Example 3-5 | 1:9 | 1267 | 90.2 | 85.2 |
| Comparative Example 3-1 | 5:5 | 902 | 86.8 | 58 |
| Comparative Example 3-2 | 4:6 | 1013 | 85.3 | 48 |
| Comparative Example 3-3 | 3:7 | 1117 | 83.5 | 42 |
| Comparative Example 3-4 | 2:8 | 1220 | 82.0 | 36 |
| Comparative Example 3-5 | 1:9 | 1324 | 80.8 | 33 |

The negative electrode active material particles prepared in Example 1-4 was mixed with natural graphite as in Examples 3-1 to Examples 3-5, life deterioration was not observed even when an excessive amount of SiO$_x$ was added. This means that since a volume change of SiO$_x$ is suppressed during charge and discharge, deterioration of graphite was not accelerated.

However, in Comparative Examples 3-1 to 3-5 to which the negative electrode active material particles of Comparative Example 1-1 were applied, it was found that even with mixing of SiO$_x$ having a large volume change during charge and discharge and graphite having a relatively good volume change, electrode deterioration due to a rapid volume change of SiO$_x$ occurred so that the life characteristic was decreased below expectation.

5. Analysis of Crystallinity of Surface and Cross Section of Negative Electrode Active Material Particles by Raman Spectrum Analysis A negative electrode was produced in the same manner as in Example 1-5, except that the negative electrode active material having a weight ratio of natural graphite:negative electrode active materials (SiO$_x$ particles) of 5:5 was prepared. Analysis of a Raman spectrum of the surface and a cross section was performed on a fresh negative electrode (Examples 1-5-1 and 1-5-2) which did not undergo an electrochemical reaction and a negative electrode after one cycle of charge and discharge (Examples 1-5-3 and 1-5-4), respectively, and the results are shown in the following Table 7.

Meanwhile, one cycle of charge and discharge was performed under the conditions of CC charge (0.1 C, 0.01 V cut-off), CV charge (0.01 V, 0.01 C cut-off), and CC discharge (0.1 C, 1.5 V cut-off), an Invia confocal Raman microscope available from Renishaw (UK) was used for Raman spectrum analysis, and the surface and the cross section of the negative electrode were measured 8 times in a range of 67-1800 cm$^{-1}$ in a static mode at a laser wavelength of 532 nm at a lens magnification of 50 times, and the average value thereof was applied.

TABLE 7

| | Raman spectrum analysis | | |
|---|---|---|---|
| | Peak position C (cm$^{-1}$) | D band | G band |
| Example 1-5 | 462.6 | — | — |
| Example 1-5-1 (Fresh, surface) | 470 | 1343 | 1572 |
| Example 1-5-2 (Fresh, cross section) | 454 | 1343 | 1586 |
| Example 1-5-3 (1 cycle, surface) | 456 | 1343 | 1577 |
| Example 1-5-4 (1 cycle, cross section) | 472 | 1346 | 1575 |

Referring to Table 7, in the Raman spectrum analysis of the surface and the cross section of the negative electrodes of Examples 1-5-1 to 1-5-4, a D-band was confirmed at 1340 cm$^{-1}$ to 1350 cm$^{-1}$, and a G-band was confirmed at 1570 cm$^{-1}$ to 1590 cm$^{-1}$. This may be explained by the D-band and G-band caused by the natural graphite active material and the carbon conductive material contained in the electrode.

In addition, from the results of analyzing the surface of the electrode, it was found that the position of Raman Peak position C of the fresh electrode and the electrode after one cycle was at 450-480 cm$^{-1}$, which is similar to the results of the powder sample of Example 1-5. It was also confirmed from the results of analyzing the cross section of the electrode that the position of Raman Peak position C of the fresh electrode and the electrode after one cycle was at 450-480 cm$^{-1}$, which is also similar.

Figure 1:
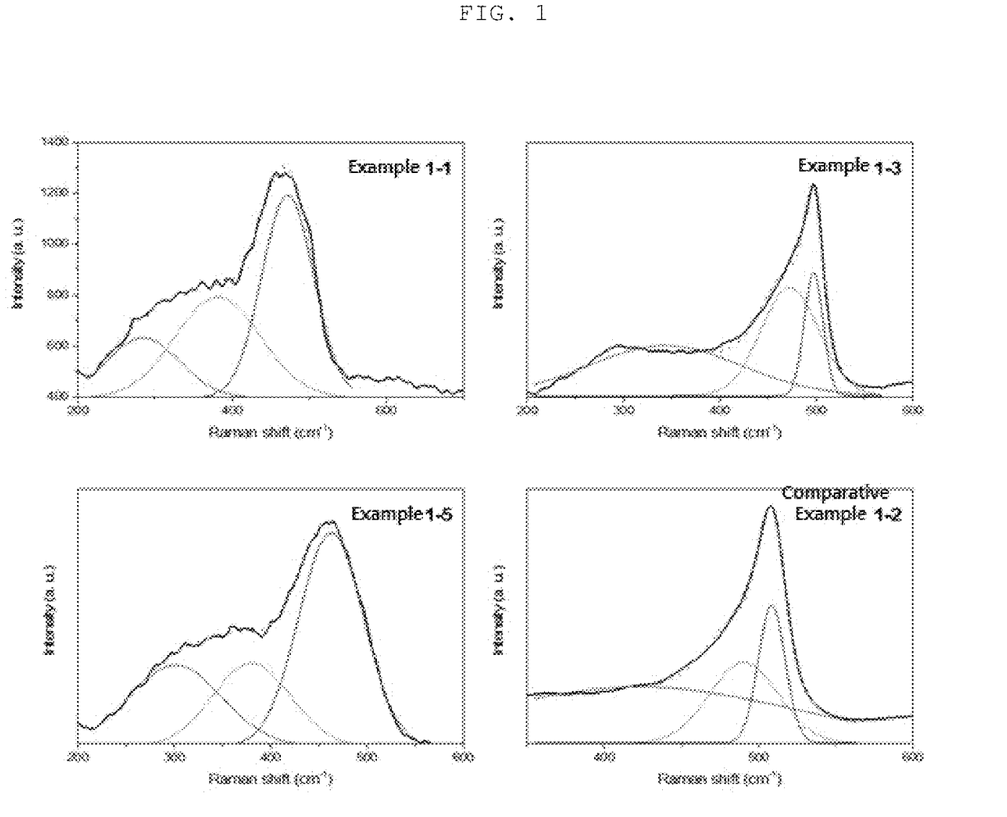
FIG. 1 is graphs showing that a result of Raman spectrum analysis of Examples 1-1, 1-3, and 1-5, and Comparative Example 1-2 are subjected to deconvolution into three peaks.
Figure 2:
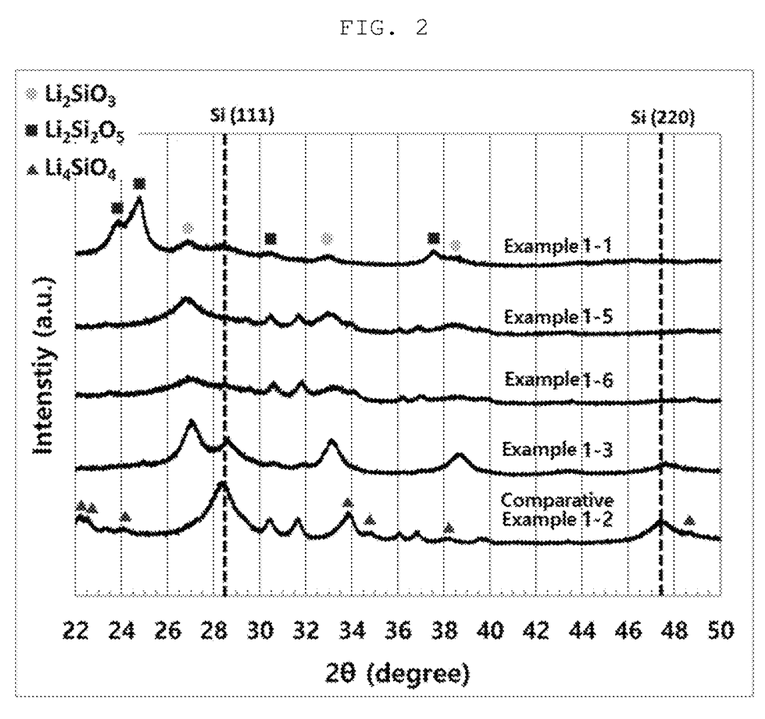
FIG. 2 is a graph of X-ray diffraction analysis of Examples 1-1, 1-3, 1-5, and 1-6, and Comparative Example 1-2.
Figure 3:
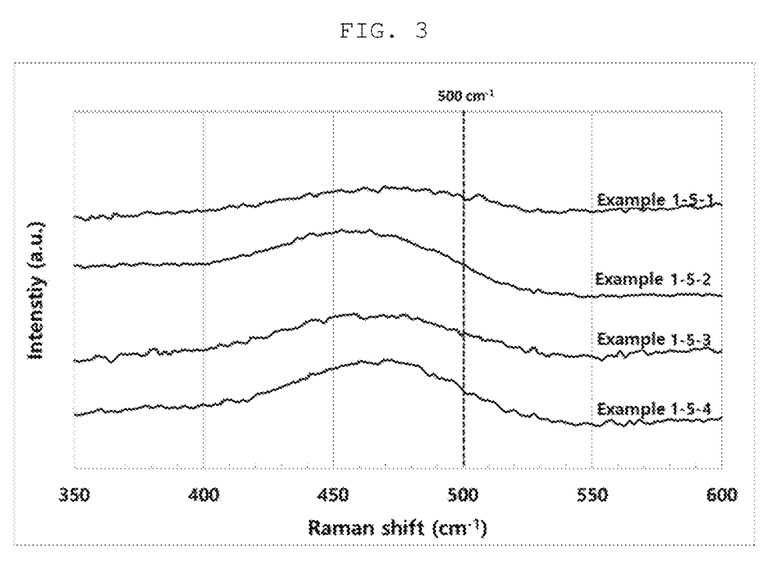
FIG. 3 is a graph of Raman spectrum analysis of a surface and a cross section of negative electrodes produced by Examples 1-5-1 to 1-5-4.

Referring to Table 7 and FIG. 3, it was confirmed that even if the sample prepared in the present invention was manufactured as an electrode and the cycle was performed, there was no denaturation such as material crystallization and the amorphous state was well maintained.

Expansion of silicon-based oxide particles may be suppressed to improve battery stability and a life characteristic, and Li pretreatment on the silicon-based oxide may be performed to solve an initial efficiency deterioration problem.

In addition, the Li pretreatment may be performed under specific conditions to improve energy costs during the Li pretreatment, and a ratio of a specific phase of the lithium silicate formed may be adjusted to optimize a capacity characteristic.

In addition, since the problem of the initial efficiency of the silicon oxide is improved by the Li pretreatment, a problem in which crystallinity of the silicon-based oxide is correspondingly increased (increase in a c-Si/a-Si ratio) arises, but this problem is solved by performing preparation of a raw material of a silicon oxide and the Li pretreatment under specific conditions, and as a result, electrochemical properties may be further improved.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode active material comprising:
negative electrode active material particles including a silicon oxide (SiO$_x$, 0<x≤2) and at least one lithium silicate selected from Li$_2$SiO$_3$, Li$_2$Si$_2$O$_5$, and Li$_4$SiO$_4$ in at least a part of the silicon oxide,
wherein when a signal generated in a region of 200 to 600 cm$^{-1}$ according to a Raman spectrum is subjected to deconvolution into three peaks, which are set to peak A, peak B, and peak C from lowest to highest of an absolute value of a wavenumber, the negative electrode active material particles satisfy the following Relations 1, 2, and 3:

$$0.36 \leq D\ (=C'/B'-C''/B'') \leq 0.92 \quad \text{[Relation 1]}$$

wherein
D is a difference value of a peak area ratio (C''/B'') from a peak intensity ratio (C'/B'),
the peak intensity ratio (C'/B') is a ratio of an intensity of the peak C to an intensity of the peak B, and
the peak area ratio (C''/B'') is a ratio of an area of the peak C to an area of the peak B, $$1.13 \leq \text{peak intensity ratio } (C'/B') \leq 2.82 \quad \text{[Relation 2]}$$

wherein the peak intensity ratio (C'/B') is a ratio of the intensity of the peak C to the intensity of the peak B, and $$0.37 \leq \text{peak area ratio } (C''/B'') \leq 2.46 \quad \text{[Relation 3]}$$

wherein the peak area ratio (C''/B'') is a ratio of the area of the peak C to the area of the peak B, and
wherein the peak C is positioned at a region of 471.9 cm$^{-1}$ or less, and is derived from amorphous Si and amorphous Si of the lithium silicate, and
wherein a content of amorphous Si is larger than a content of crystalline Si in the negative electrode active material particles.

2. The negative electrode active material of claim 1, wherein the negative electrode active material particles include 10 to 100 wt % of the lithium silicate with respect to a total weight.

3. The negative electrode active material of claim 1, wherein the negative electrode active material particles have a peak area ratio H/I according to an X-ray diffraction analysis method of less than 5.54, wherein H is an area of a Li$_2$Si$_2$O$_5$ peak positioned at 24.9±0.3°, and I is an area of a Li$_2$SiO$_3$ peak positioned at 26.9+0.3° in X-ray diffraction analysis.

4. The negative electrode active material of claim 1, wherein the negative electrode active material particles have a peak area ratio G/H according to the X-ray diffraction analysis method of less than 45.99, wherein G is an area of a Si peak positioned at 28.4+0.3°, and H is an area of a Li$_2$Si$_2$O$_5$ peak positioned at 24.9±0.3° in the X-ray diffraction analysis.

5. The negative electrode active material of claim 1, wherein the negative electrode active material particles have a peak area ratio G/I according to the X-ray diffraction analysis method of less than 8.75, wherein G is an area of a Si peak positioned at 28.4±0.3°, and I is an area of a Li$_2$SiO$_3$ peak positioned at 26.9±0.3° in the X-ray diffraction analysis.

6. The negative electrode active material of claim 5, wherein the peak area ratio G/I according to the X-ray diffraction analysis method is less than 1.1.

7. The negative electrode active material of claim 1, wherein the negative electrode active material particles include 25 wt % or less of $Li_4SiO_4$ with respect to the total weight.

8. The negative electrode active material of claim 1, wherein the negative electrode active material includes 50 wt % or more of the negative electrode active material particles with respect to the total weight.

9. A negative electrode comprising a negative electrode active material layer comprising: the negative electrode active material of claim 1 and a water-based binder.

10. A lithium secondary battery comprising: the negative electrode of claim 9; a positive electrode; a separator positioned between the negative electrode and the positive electrode; and an electrolyte.

* * * * *